United States Patent [19]

Su

[11] Patent Number: 4,859,398
[45] Date of Patent: Aug. 22, 1989

[54] HIGH SHEAR EXTRUSION OF LINEAR LOW DENSITY POLYETHYLENE

[75] Inventor: Tien-Kuei Su, Belle Mead, N.J.

[73] Assignee: Mobil Oil Corporation, New York, N.Y.

[21] Appl. No.: 69,543

[22] Filed: Jul. 2, 1987

[51] Int. Cl.$^4$ .............................................. B29C 47/86
[52] U.S. Cl. .................... 264/564; 264/176.1; 264/211.21; 264/237; 425/326.1; 425/378.1
[58] Field of Search ............... 264/564, 211.21, 176.1, 264/348, 237; 425/113, 144, 378 R, 380, 326.1, 378.1

[56] References Cited

U.S. PATENT DOCUMENTS

| | | | |
|---|---|---|---|
| 2,991,508 | 7/1961 | Fields et al. | 264/211.21 |
| 3,023,461 | 3/1962 | Sherman | 264/515 |
| 3,351,695 | 11/1967 | Hollingsworth | 425/113 |
| 3,376,605 | 4/1968 | Beattie | 425/205 |
| 3,382,220 | 5/1968 | Bowman, Jr. | 425/380 |
| 3,382,535 | 5/1968 | Ferrari | 425/461 |
| 3,574,808 | 4/1971 | Matthews et al. | 264/908 |
| 3,784,661 | 1/1974 | Schaul et al. | 264/98 |
| 3,874,837 | 4/1975 | Jamieson | 425/378 |
| 3,876,740 | 4/1975 | Egli et al. | 264/48 |
| 3,879,158 | 4/1975 | Schele | 425/380 |
| 3,879,507 | 4/1975 | Cavanna et al. | 264/51 |
| 3,914,366 | 10/1975 | Wilson | 264/177 |
| 3,920,782 | 11/1975 | Cogswell | 264/98 |
| 3,994,654 | 11/1976 | Chyu | 425/376 |
| 4,021,170 | 5/1977 | Andersen et al. | 425/72 |
| 4,053,270 | 10/1977 | Collier | 425/144 |
| 4,093,692 | 5/1978 | Hill | 526/106 |
| 4,187,269 | 2/1980 | Hutchinson et al. | 264/171 |
| 4,216,253 | 8/1980 | Bonnebat et al. | 425/144 |
| 4,243,619 | 1/1981 | Fraser et al. | 264/40.6 |
| 4,246,212 | 1/1981 | Upmeier et al. | 264/40.1 |
| 4,267,146 | 5/1981 | Kurtz et al. | 264/564 |
| 4,282,177 | 8/1981 | Kurtz et al. | 264/564 |
| 4,348,349 | 9/1982 | Kurtz | 264/564 |
| 4,360,494 | 11/1982 | Kurtz | 264/564 |
| 4,615,858 | 10/1986 | Su | 264/564 |
| 4,623,502 | 11/1986 | Cohen | 264/176.1 |
| 4,713,205 | 12/1987 | Su | 264/564 |
| 4,734,240 | 3/1988 | Chung et al. | 425/378 R |

FOREIGN PATENT DOCUMENTS

| | | | |
|---|---|---|---|
| 0152865 | 8/1985 | European Pat. Off. | 264/564 |
| 0212731 | 3/1987 | European Pat. Off. | 264/237 |

OTHER PUBLICATIONS

John Wales & Sons, Inc., A Comparison of Melt Fracture Initiation Conditions in Capillaries and Slits, 1977, p. 1177.

J. P. Tordella, Capillary Flow of Molten Polyethylene-A Photographic Study of Melt Fracture, 1957, pp. 203-212.

Tien-Kuei Su, Melt Fracture and Flow Instability of Polyethylene Melts, 1983.

*Primary Examiner*—Jeffery Thurlow
*Attorney, Agent, or Firm*—Alexander J. McKillop; Charles J. Speciale

[57] ABSTRACT

A method for the extrusion of polyethylene resins, especially linear low density polyethylene resins and; more particularly, a method of high shear extrusion through the intermediary of which the frequently encountered melt fracture; for instance, such as the sharkskin melt fracture of linear low density polyethylene can be either reduced or even completely eliminated by effecting the extrustion at a high shear rate or shear stress over the lip section of a tubular or sheet extrusion die.

5 Claims, 4 Drawing Sheets

FIG.3A  T=390°F
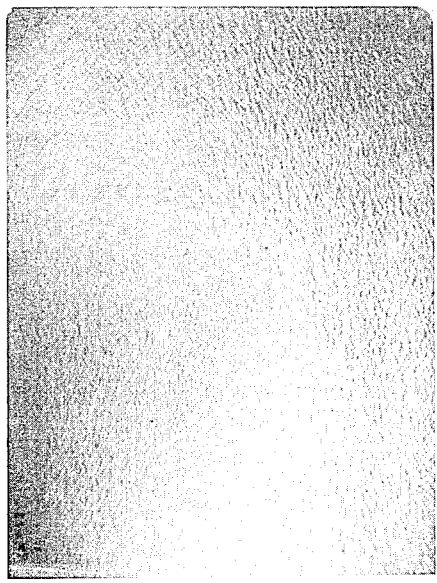
FIG.3C  T=320°F
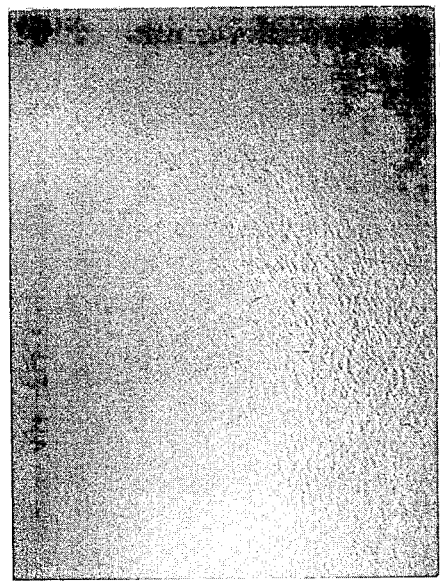
FIG.3B  T=300°F

T=430°F

T=330°F

HIGH SHEAR EXTRUSION OF LINEAR LOW DENSITY POLYETHYLENE

BACKGROUND OF THE INVENTION

1. Field of the Invention

The present invention relates to a method for the extrusion of polyethylene resins, especially linear low density polyethylene resins and; more particularly, relates to a method of high shear extrusion through the intermediary of which the frequently encountered melt fracture; for instance, such as the sharkskin melt fracture of linear low density polyethylene can be either reduced or even completely eliminated by effecting the extrusion at a high shear rate or shear stress over the lip section of a tubular or sheet extrusion die.

An extremely high percentage of various types of polyethylene resins or polymers, and particularly linear low density polyethylene (LLDPE), is processed or extruded into film material, wherein such film material has found widespread application and acceptance in the packaging industry; for instance, in its employment in the packaging of meat, frozen foods, produce, as boilable or microwavable pouches, and in conjunction with various textile and paper products, industrial liners, shipping sacks, and different types of stretch wrap and shrink wrap sheeting material.

In addition to the foregoing, a considerable volume of extruded polyethylene film material is widely employed in the construction industry and in agriculture, particularly in the form of wide heavy-gauge film webs; attesting to the high level of economic acceptance and importance of this product.

Polyethylene film material of varying kinds, and to an appreciable extent, linear low density polyethylene film, is generally produced through well known tubular blown film extrusion methods and apparatus, or in some instances, through the utilization of sheet extrusion dies. Different types of films may range in size from extruded tubes of about 2" in diameter or less, to huge tubular bubbles adapted to form a layflat film of up to 20 ft. in width, which, when slit, will produce film webs of up to about 40 ft. in width.

2. Discussion of the Prior Art

Among various technical and production problems which are encountered during the extruding of linear low density polyethylene resins, is that of the formation of irregularities in the film material which adversely affect the film properties; for instance, sharkskin melt fractures, whereby the molten polymer extrudates which are propagates through the extrusion dies exhibit deleterious variations in size and shape, resulting from flow defects. Such distortions in the extrudates which are encountered at or above specific critical shear rate or stress levels is associated with resultant melt fracture, particular sharkskin melt fracture. Experimentation has evidenced that melt fracture and an unstable flow of extruded polyethylene resins, including linear low density polyethylene, generally occurs in the extrusion die or upon emerging from the lip or die orifice, and which is commonly known as land-fracture.

Linear low density polyethylene resins without long chain branching generally evidence a narrower molecular weight distribution, which basically imparts two rheological characteristics to the polyethylene resin; in essence, (a) a high shear viscosity; in effect, less shear thinning; and (b) low melt tension; in essence, a low melt strength and a low elongational viscosity. The first-mentioned rheological characteristic results in an encountering of the annoyance of melt fracture, particularly sharkskin melt fracture, during the process of extruding the polyethylene material. Generally, it is possible to effect a reduction in the melt fracture of linear low density polyethylene encountered during extrusion into a film web by decreasing the shear rate or shear stress; by raising the processing temperature, or by increasing the die flow cross-section of the extrusion apparatus; or finally, by decreasing the output rate of the extruder.

In essence, the concept of raising the process or extrusion temperature in order to ameliorate problems which are encountered due to melt fracture, and particularly sharkskin melt fracture of polyethylene materials, such as linear low density polyethylene, in turn, generates the problem of an adverse effect on the bubble stability of linear low density polyethylene for a blown tubular film extrusion process, inasmuch as the polyethylene possesses a low melt strength. Conversely, decreasing the output rate of the extruder in order to obviate melt fracture, causes the overall extrusion operation to become less economical.

Thus, Kurtz, et al. U.S. Pat. No. 4,282,177 discloses a method for reducing sharkskin melt fracture during the extrusion of ethylene polymers, including linear low density polyethylene, in which an attempt is conducted for solving the problem of reducing melt fracture through a change in the cross-section of the die lip or land of the extrusion apparatus, by increasing processing temperature, or alternatively, by decreasing the rate of output of the extrusion apparatus. Although all of these specific paths of approach to the problem provide some improvement in ameliorating the effects and presence of melt fracture encountered during the extrusion of polyethylene resins, they are still inadequate to meet the demands of industry.

The problems of extrudate distortion of linear low density polyethylene resins and similar types of polymers have been discussed to some extent by J. P. Tordella, Trans. Soc. Rheol., 1. 203 (1957); by J. Vlachopulos and T. W. Chan, Journal of the Applied Polymer Science, 21, 1177 (1977); and by T. K. Su, E. Colombo, N. Youngjohn, "Melt Fracture and Flow Instability of Polyethylene Melts", Technical Report T-312 (1983) Mobil Chemical Company. All of the foregoing publications, in varying degrees, discuss the traditional approaches to and the attendant shortcomings in eliminating melt fracture in extruded polyethylene resins; and particularly reducing and/or eliminating sharkskin melt fracture in linear low density polyethylene resins.

Furthermore, Cogswell U.S. Pat. No. 3,920,782 discloses the appearance of sharkskin melt fracture during the extrusion of polymeric materials, and which can be controlled or even eliminated by cooling an outer layer of the material to a reduced temperature level, while maintaining the bulk of the melt at the optimum working temperature. This requires an extensive and complex method of extrusion which, however, does not necessarily produce the desired results in eliminating sharkskin melt fracture of polyethylene extrudates.

Kurtz, et al. U.S. Pat. No. 4,267,146, and Kurtz U.S. Pat. Nos. 4,348,349 and 4,360,494 also disclose other methods employed in reducing melt fracture encountered in various types of ethylene copolymers by varying the configurations of the die orifices and lip surfaces of extrusion apparatus.

SUMMARY OF THE INVENTION

In distinct contrast with the foregoing, pursuant to the invention, it has now been ascertained that, surprisingly, the melt fracture, and particularly sharkskin melt fracture, of polyethylene resins, such as linear low density polyethylene, can be reduced to a considerable degree or even completely eliminated by extrusion of the resins at an extremely high shear rate or shear stress across the die lip section of an extrusion apparatus such as a tubular blown film or sheet extrudes, normally shear rates of that level being considered in the technology as inapplicable to the elimination or reduction of melt fracture of linear low density polyethylenes during extrusion thereof.

Pertaining to the foregoing, the applicant has, in a unique and novel manner, devised a method for reducing or even completely eliminating melt fracture, particularly the sharkskin melt fracture encountered in polyethylene resins, such as linear low density polyethylene, through extruding at extremely high shear rates or shear stresses, accomplished by decreasing the temperature of the extrudate or the die cross-section only at the lip region of the extrudes, and by increasing the output rate of the extrudate, or through a combination of the above-mentioned integers.

In order to achieve the intended reduction in melt fracture, the applicant inventively contemplates a decrease in the normal extrusion temperature of down to approximately 140° C.; in essence, to a temperature level which is only slightly higher then the melting temperature of the polyethylene resins which are normal in the range of 110° C. to 135° C. Moreover, the shear stress employed during extrusion of the polyethylene resin, depending upon both temperature and shear rate, is inventively increased to a level of above $2 \times 10^5$ dynes/in.$^2$ and preferably above $1 \times 10^6$ dynes/in.$^2$; in essence, corresponding to an increase in the shear rate of up to preferably 1,000 sec$^{-1}$ and even up to 1,500 sec$^{-1}$, resulting in an unexpected reduction of the melt fracture and an improvement in the surface of the extrudate, causing it to appear slick and smooth in a highly desirable and attractive manner.

Accordingly, it is an object of the present invention to provide a novel method for the high shear extrusion of polyethylene resins, and particularly for linear low density polyethylene resins.

A more specific object of the present invention is to provide a method for the high shear extrusion of linear low density polyethylene wherein the melt fracture of the linear low density polyethylene can be either reduced or even eliminated by extrusion at a high shear stress level across the die lip section of an extrusion apparatus.

Still another object of the present invention is to provide for a high shear extrusion method of the type described, in which melt fracture can be either reduced or eliminated through a decrease in the processing temperature while extruding the polyethylene extrudate at a high shear rate; in effect, under a high shear stress, which will enable an increase in the output of the extrudate while concurrently eliminating or reducing melt fracture or unstable flow conditions for the linear low density polyethylene.

BRIEF DESCRIPTION OF THE DRAWINGS

Reference may now be had to the following detailed description of the inventive high shear extrusion method for linear low density polyethylene, having reference to the accompanying illustrations; in which:

FIGS. 3 and 4 illustrate a linear low density film fabricated by a blown film process through, respectively, 1¼ in. and 3 in. extrusion dies, in accordance with the inventive method for the elimination or reduction of melt fracture.

DETAILED DESCRIPTION

In industry, polyethylene resins, particularly linear low density polyethylene resins, are normally extruded through tubular blown film or sheet extruders at commercial shear rates within the range of about 200 to 250 sec$^{-1}$, and at extrusion temperatures of 190° C. or higher. Any increase in the shear rate, or decrease in the temperature, will generally cause the extruded thermoplastic material, such as a film web, to have a surface appearance exhibiting screw-like distortions or unsightly markings representative of melt fracture, especially sharkskin melt fracture.

Figure 1:
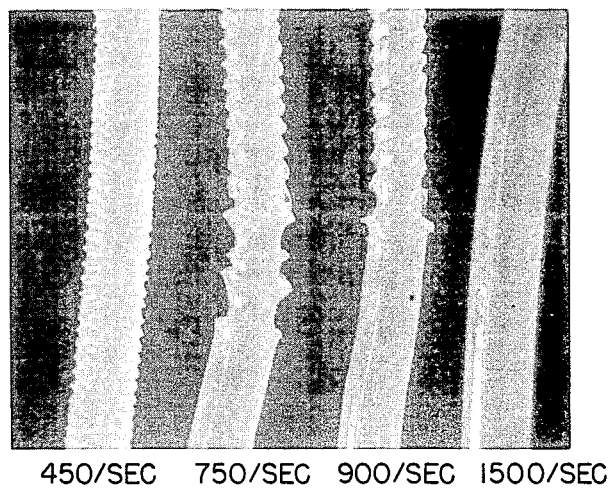
FIG. 1 illustrates, on an extensively enlarged scale, a portion of a extruded linear low density polyethylene film produced at various shear rates.

Referring in particular to FIG. 1, it is clearly apparent that, at a shear rate of about 450 sec$^{-1}$ and at an extrudate temperature of 190° C., the film exhibits the illustrated distortions; in essence, sharkskin melt fracture. Increasing the shear rate to, respectively, 750 sec$^{-1}$ and 900 sec$^{-1}$, the length of the screw-like portions of the distorted film extrudate decreases; however, the degree of distortion, represented by the depth and the pitch of the screw structure, will increase dramatically. However, upon increasing the shear rate to 1500 sec$^{-1}$, the surface of the extrudate becomes unexpectedly somewhat more slick and smooth.

Figure 2A:
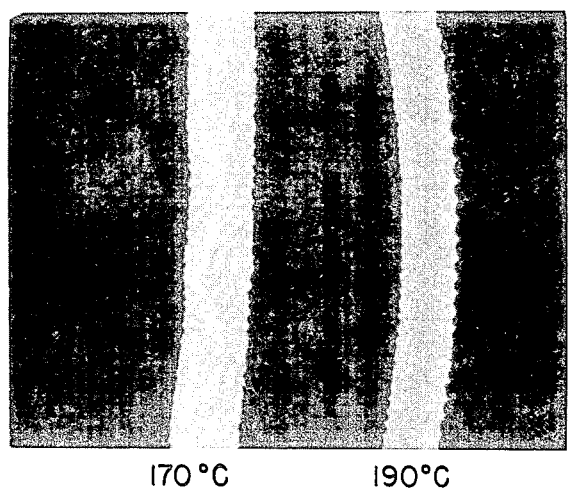
FIGS. 2a and 2b, similarly to FIG. 1, illustrate a linear low density polyethylene film extruded at various shear rates at a reduced temperature pursuant to the inventive method.
Figure 2B:
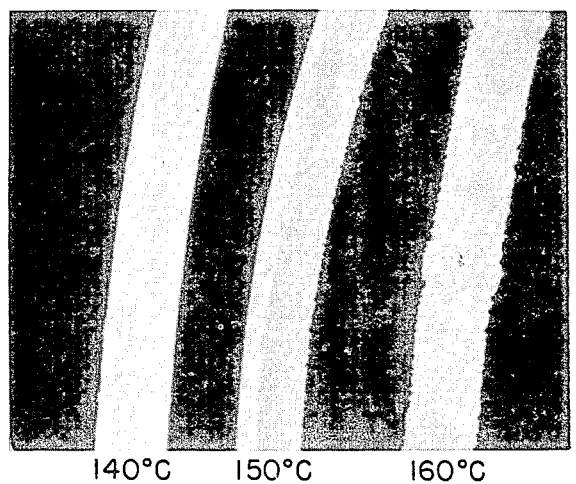

Reverting to the representation of FIGS. 2a and 2b, there is illustrated an unexpected reduction in the distortion of the extrudate at high shear by a progressive decrease in the processing temperature of the extrudate from 190° C. to 140° C.; in effect, by reducing the temperature of extrusion to slightly above the melt temperature of the resins, which is generally within the range of about 110° C. to 135° C. Thus, at the lower temperature, in a clearly surprising and unexpected manner, FIGS. 2a and 2b demonstrate that the melt fracture of linear low density polyethylene can be reduced, or even practically eliminated, by extruding at a high shear stress level, for example, at above $2 \times 10^5$ dynes/in.$^2$, and preferably above $1 \times 10^6$ dynes/in.$^2$.

Figure 4A:
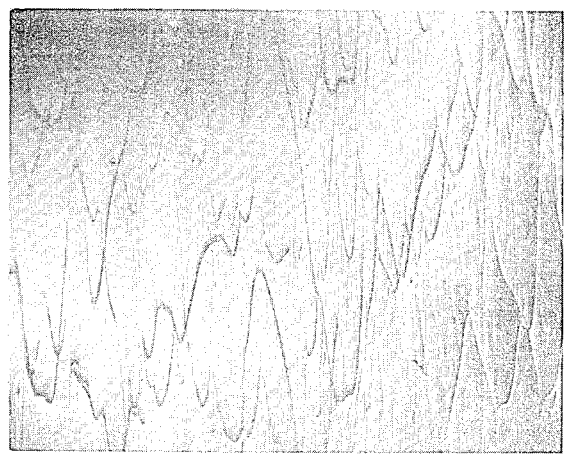
Figure 4B:
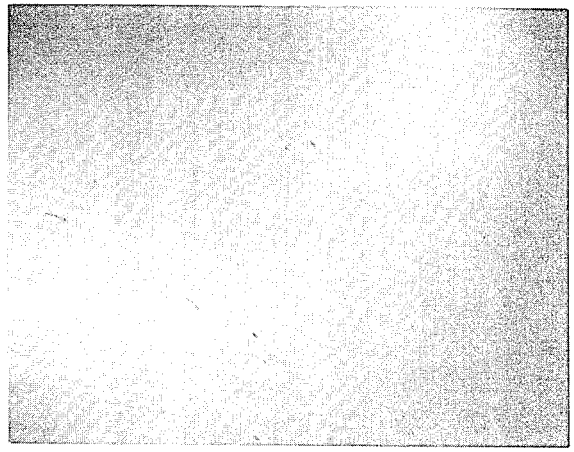

Investigating the surface texture of the linear low density polyethylene film extruded at high shear stress; in essence, at high shear rate and lower temperature pursuant to the present method, as shown in FIGS. 3 and 4, by a blown tubular film process through, respectively, 1¼ in. and 3 in. dies, there is again evidenced the unexpected elimination of surface distortion caused by melt fracture, by lowering the temperature during extrusion at a high shear rate over the die lip section of the extrusion apparatus.

In summation, it becomes readily apparent that because of the novel application of reduced extrudate process temperatures and by dramatically increasing the extrusion shear rate to 1,000 sec$^{-1}$ and higher, to thereby generate a shear stress in the range of above $2 \times 10^5$ dynes/in$^2$, and preferably above $1 \times 10^6$ dynes/in.$^2$, contrary to the expectations of the technology, there is obtained a reduction or elimination of surface distortion due to melt fracture, or sharkskin melt fracture.

As may be readily understood, the inventive method is not restricted to extrusions through tubular dies, but is also applicable to extrusion of linear low density polyethylene through sheet dies or the like.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A method for the reduction of melt fracture encountered during the high shear extrusion of polyethylene resins normally producing higher levels of melt fracture; comprising reducing the processing temperature of the polyethylene resin to a temperature of about 140° C. during extrusion of said polyethylene resin over the die lip of an extrusion apparatus, which temperature is only slightly higher than the melting temperature of the resin; and extensively increasing the shear rate of the resin to within the range of about 1,000 sec$^{-1}$ to 1,500 sec$^{-1}$ for extruding at an extremely high shear stress of above $2 \times 10^5$ dynes/inc.$^2$.

2. A method as claimed in claim 1, wherein said shear stress is above $1 \times 10^6$ dynes/in.$^2$.

3. A method as claimed in claim 1, wherein said polyethylene resin is constituted of linear low density polyethylene.

4. A method as claimed in claim 1, wherein said polyethylene resin is extruded through a tubular die into a blown tubular film web.

5. A method as claimed in claim 1, wherein said polyethylene resin is extruded through a sheet die.

* * * * *